United States Patent [19]

Boulter

[11] 3,846,583

[45] Nov. 5, 1974

[54] DIGITAL COMMUNICATION SYSTEMS

[75] Inventor: Richard Arnold Boulter, Saint Albans, England

[73] Assignee: The Post Office, London, England

[22] Filed: Oct. 18, 1972

[21] Appl. No.: 298,518

[52] U.S. Cl. .......................... 178/67, 178/68, 325/30, 325/163, 332/10

[51] Int. Cl. .......................... H04l 25/02

[58] Field of Search .......... 178/66, 67, 68; 325/30, 325/45, 126, 145, 163, 344, 346, 65, 50, 60, 38 A, 31, 136, 137, 138, 42, 44–46, 144; 332/9, 10, 16

[56] References Cited

UNITED STATES PATENTS

| | | | |
|---|---|---|---|
| 3,242,431 | 3/1966 | Crafts | 178/66 |
| 3,312,901 | 4/1967 | Becker et al. | 325/50 |
| 3,335,369 | 8/1967 | Priebe | 325/30 |
| 3,518,680 | 6/1970 | McAuliffe | 325/60 |

*Primary Examiner*—Robert L. Griffin
*Assistant Examiner*—Marc E. Bookbinder
*Attorney, Agent, or Firm*—Kemon, Palmer & Estabrook

[57] ABSTRACT

The invention is particularly applicable to line telephony and relates to a method and apparatus for converting an isochronous baseband data signal into a diphase signal and vice versa. The diphase transmission is considered as a phase modulation or double-sideband suppressed-carrier in which the modulating signal switches the phase of a carrier whose fundamental frequency in hertz is the same as the modulation rate in bauds. The resulting modulated signal contains fold-over components which are used to advantage by introducing a 90° phase shift between the carrier and base band signals to reduce the line signal level at low frequencies where the line distortion is most severe and enhance the signal level at high frequencies where the attenuation is greatest. The need for line equalisation is therefore reduced.

4 Claims, 6 Drawing Figures

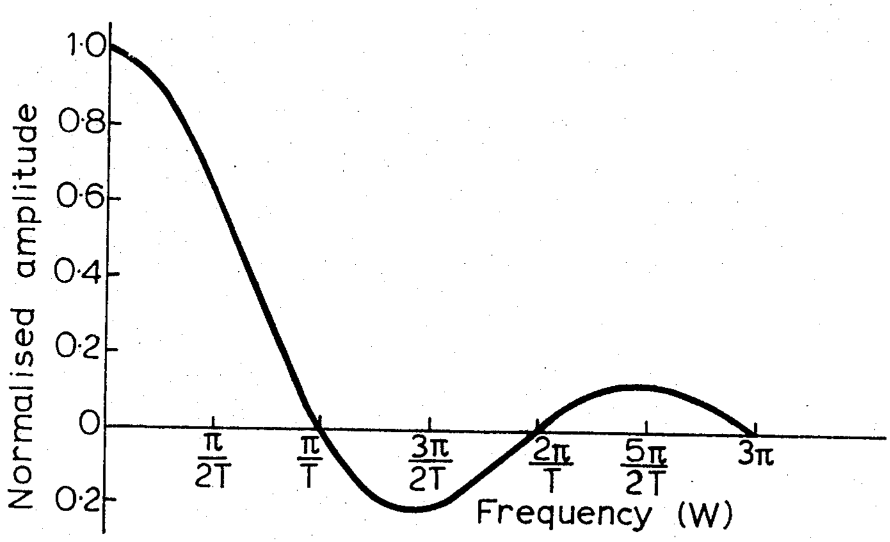
Fig. 1. Amplitude frequency spectrum of pseudo-random pattern $\left(\frac{\sin\frac{WT}{2}}{\frac{WT}{2}}\right)$
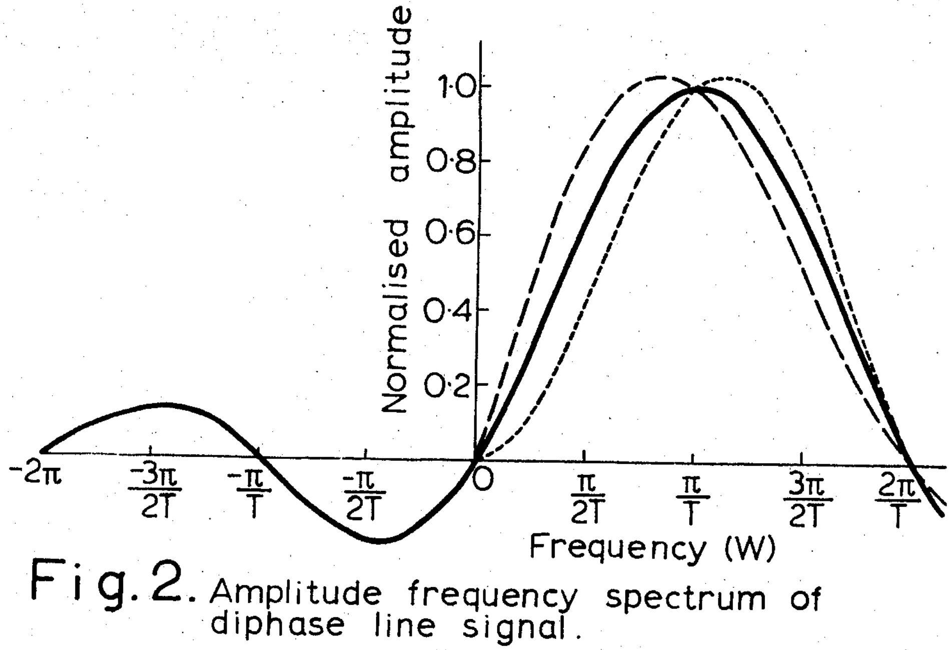
Fig. 2. Amplitude frequency spectrum of diphase line signal.
——————With in-phase carrier
-----------With 90° phase carrier

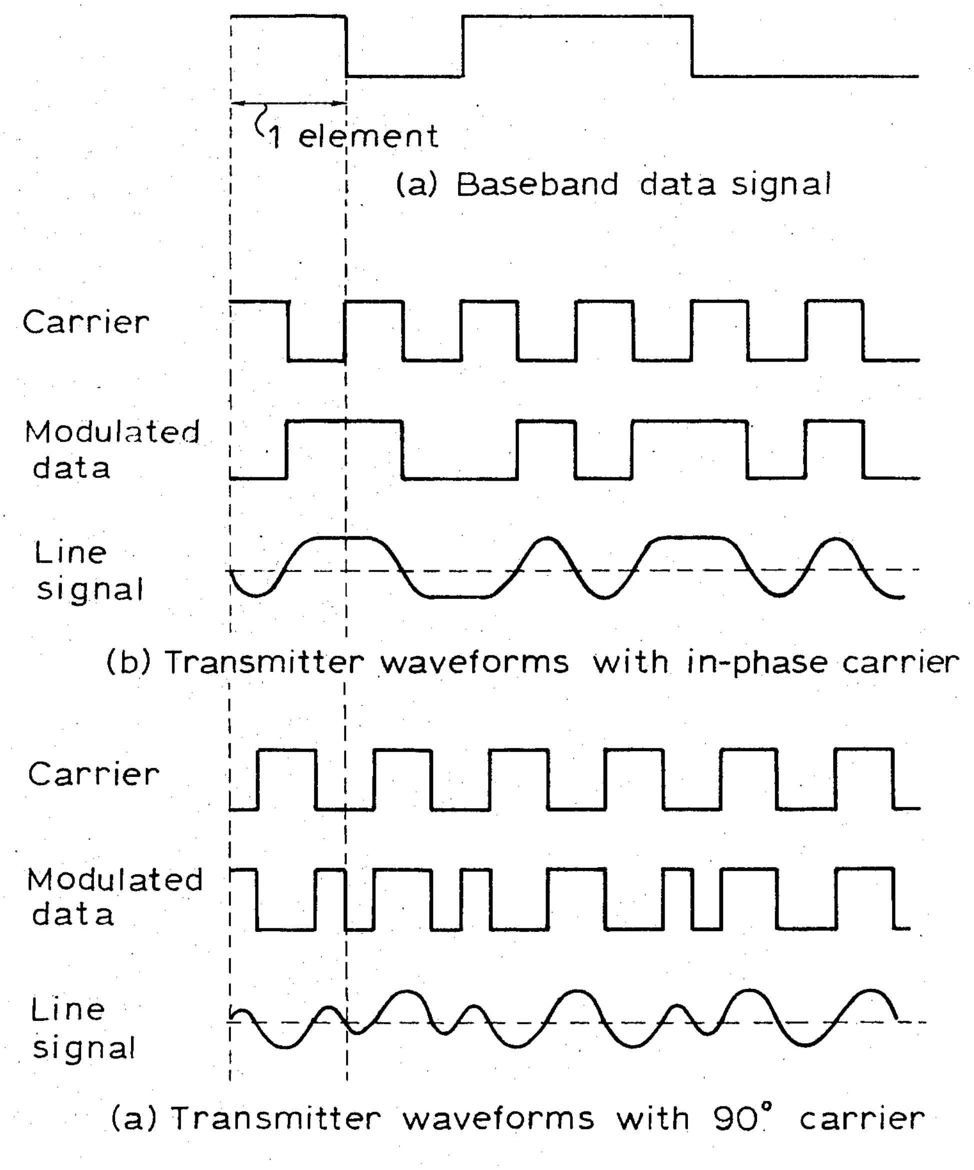
Fig. 3. Waveforms of signals in diphase transmitter.

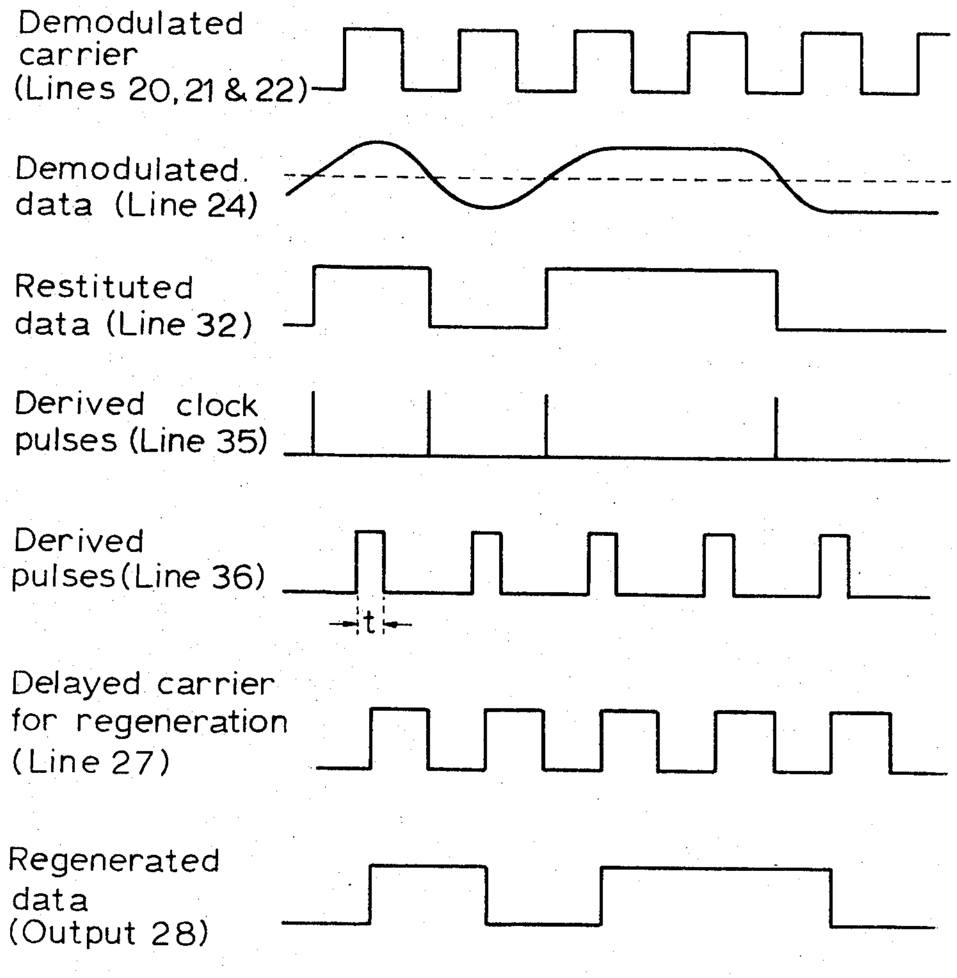
Fig. 6. RECEIVER WAVEFORMS

DIGITAL COMMUNICATION SYSTEMS

This invention relates to digital communications systems and in particular to a method of communicating digital data in the form known as diphase or dipulse and apparatus therefor.

Diphase transmission is normally regarded as a baseband digital system in which 01 and 10 are transmitted to represent the two significant conditions of the source data. Thus the line signal is equivalent to a serial stream at twice the original modulation rate, but with a coding restriction which introduces a certain amount of correlation or redundancy. This redundancy enables clock information to be easily extracted from the receive signal no matter what the content of the transmitted data. It is obvious that clock information is present at all times since a line signal transition will always occur at the centre of each data element. Following the baseband philosophy, the double-speed line signal can be received in low-pass form, regenerated and decoded digitally, and some modems have been developed on this principle. It is necessary to incorporate means for avoiding timing and polarity ambiguities and, with some methods of reception, a 3dB signal/noise ratio penalty is incurred. More important than this, perhaps, is the fact that with all these methods the line characteristic will require equalization up to twice the frequency required for a normal baseband transmission.

Another way to consider diphase transmission is as a phase modulation or double-sideband suppressed-carrier (DSB SC system) in which the modulating signal switches the phase of a carrier whose frequency in hertz (fundamental frequency in the case of a square wave carrier) is the same as the modulation rate in bauds and the present invention is based on this way of considering diphase transmission. The signal may also be received and demodulated coherently in a double-sideband form by means of a carrier extracted from the line signal. This carrier is also the clock and is subject to ambiguity problems similar to those encountered with the low-pass form of reception. These can be overcome however and in addition it is found that with DSB reception the need for waveform correction is drastically reduced.

In accordance with the present invention a method of converting an isochronous baseband data signal into a diphase signal includes the steps of filtering the baseband data signal to remove spectral components having a frequency greater than the reciprocal of the duration of one element of the baseband data signal, applying the filtered baseband data signal to a first input of a balanced modulating means and applying a carrier having a frequency equal to the reciprocal of the duration of one element of the baseband data signal to a second input of the modulating means arranged to produce the diphase signal at the modulating means output.

Also in accordance with the present invention a method of converting an isochronous baseband data signal into a diphase signal includes the steps of applying the unfiltered isochronous baseband data signal and a carrier having a frequency equal to the reciprocal of the duration of one element of the baseband data signal to respective inputs of a balanced modulating means and controlling the phase relation between the baseband data signal and the carrier so that at the modulating means inputs zero-crossings of the carrier occur one quarter of a cycle before transitions of the baseband data signal.

Also in accordance with the present invention a method of converting a diphase signal into an isochronous baseband data signal includes the steps of deriving a carrier signal having a frequency equal to the reciprocal of the duration of one element of the baseband data represented by the disphase signal and applying the carrier and the diphase signal to respective inputs of a balanced demodulating means to produce the baseband data signal at the demodulating means output.

According to a further aspect of the present invention a method of converting a diphase signal into an isochronous baseband data signal as set forth in the immediately preceding paragraph includes the steps of monitoring the relative phase of the derived carrier signal and transitions of the isochronous baseband data signal and adjusting the relative phase if it is outside predetermined tolerable limits.

Also in accordance with the invention a baseband to diphase converter comprises a low-pass filter adapted to receive an isochronous baseband data signal as input, a source of carrier signal of frequency equal to the cut-off frequency of the filter and a balanced modulating means, the output of the filter and the carrier signal being fed to respective first and second input ports of the modulating means arranged to produce a diphase signal at the output of the modulating means.

Also in accordance with the present invention a baseband to diphase converter comprises balanced modulating means arranged to receive an unfiltered isochronous baseband data signal as a first input and a carrier signal of frequency equal to the reciprocal of the duration of one element of the baseband data signal as a second input so as to generate a diphase signal at the output of the modulating means and phase control means operable in use to cause zero crossings of the carrier signal at the first input of the modulating means to occur a quarter of a cycle before transitions of the data signal at the second input of the modulating means.

Also in accordance with the present invention a diphase to baseband converter comprises carrier-deriving means having an input port adapted to receive a diphase signal as input and operable in use to derive a carrier signal equal in frequency to the reciprocal of the duration of one element of the isochronous baseband data signal represented by the diphase signal, balanced demodulating means operable in use to receive the diphase signal and the carrier signal as first and second inputs respectively so as to generate the isochronous baseband data signal at the output of the balanced demodulating means.

According to a further aspect of the present invention a diphase to baseband converter as set forth in the immediately preceding paragraph includes phase monitoring means operable to compare the relative phase of the derived carrier signal and transitions of the isochronous baseband data signal and to adjust the relative phase if it is outside predetermined tolerable limits.

In order that the invention may be understood and carried into effect a specific embodiment will now be described with reference to the accompanying schematic drawings of which:

FIG. 1 shows the envelope of the amplitude frequency spectrum of baseband data signals;

FIG. 2 shows the envelope of the amplitude frequency spectrum of two forms of line signal;

FIG. 3 shows waveforms of signals in a diphase transmitter;

FIG. 6 shows waveforms of signals in a diphase receiver.

If the data to be transmitted is in non-return-to-zero form, then the envelope of the baseband frequency amplitude spectrum will be as $$\mathrm{Sin}\ WT/2/WT/2$$

as shown in FIG. 1. When this signal amplitude-modulates a carrier of frequency equal to the modulation rate, then the problem of fold-over of the secondary lobes falling in the negative frequency domain occurs. How this fold-over affects the spectrum of the signal sent to line then depends upon the carrier phase. If the carrier is in phase with the modulating signal, that is the zero-crossings of the carrier occurring at the same time as the transitions of the modulating signal, then the fold-over causes the second lobe of the lower sideband to add coherently to the main lobe whilst the third lobe subtracts coherently from the main lobe of the upper side band. This thus makes the transmit spectrum unsymmetrical with more energy in the lower sideband. If the carrier is shifted in phase through 90° the role is reversed, more energy appearing in the upper sideband due to the second lobe subtracting from the lower sideband and the third adding to the upper sideband. The effect on the frequency spectrum is shown in FIG. 2 along with the symmetrical spectrum with equal sidebands. Interference in the main signal also comes from the sidebands of the DSB signal produced by the third harmonic of the carrier, but these are insignificant compared with the foldover. Both these effects can be removed by the use of a premodulator filter to eliminate the secondary lobes but in fact the combination of fold-over and 90° phase shift is advantageous in that it reduces the signal level at low frequencies where the line distortion is most severe and enhances the signal level at high frequencies where the attenuation is greatest, thus enabling greater distances to be covered without waveform correction. The latter version of diphase modulation can be described as "TOP HAT" modulation since in the case of a square wave carrier the two significant conditions of the source data are represented by an erect and inverted top hat shape respectively. A more formal name is $WAL_2$ Carrier where $WAL_2$ denotes a Walsh Function Type 2. The waveforms generated in the transmitter using either phase of carrier are shown in FIG. 3.

Figure 4:
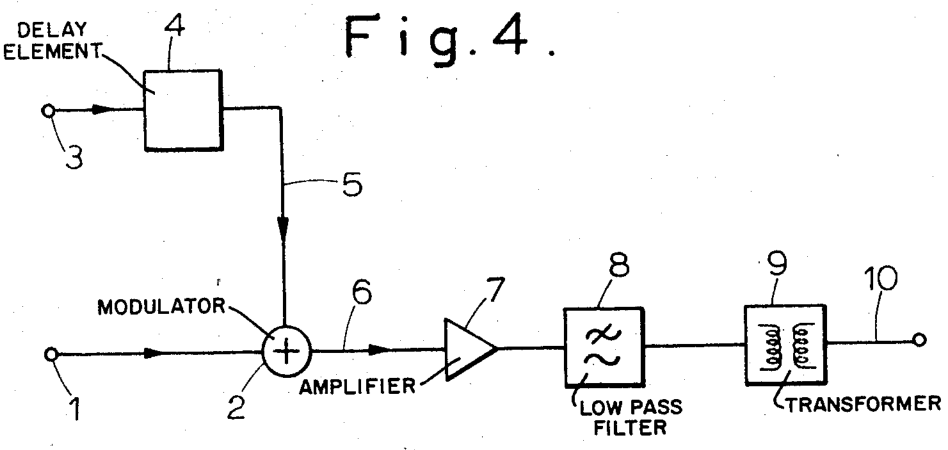
FIG. 4 shows in block diagram form a diphase transmitter.

Referring now to FIG. 4 an isochronous baseband data signal is fed from an external data source (not shown) to an input terminal 1 connected to a modulator 2. A clock or square-wave carrier signal is fed to an input terminal 3 and passes via a delay element 4 and line 5 to form a second input to the modulator 2; the period of the clock or carrier signal fed to the terminal 3 is equal to the duration of one element of the isochronous data signal fed to the terminal 1. The delay imposed by the element 4 is equal to one quarter of a period of the clock or carrier waveform. At terminal 1 and 3 transitions of the data signal and the clock signal are in synchronism and hence at the inputs to the modulator 2 transitions of the data signal occur a quarter cycle before transitions of the clock signal. The modulator 2 is shown in FIG. 4 as a modulo −2 adder since this is the simplest means of implementing the TOP HAT modulation in the case of a square wave carrier; it will be appreciated that the modulator 2 may alternatively be a product or switching-type balanced modulator, if desired.

The output of the modulator 2 is fed via a line 6 and an amplifier 7 to a low-pass output filter 8 which defines the spectrum of the signal transmitted via a line transformer 9 to a line output terminal 10. In a particular example, the duration of one bit of the isochronous baseband data signal was 1/48 ms and the fundamental frequency of the clock or carrier was 48 kHz. The fundamental sideband signal produced by the modulator 2 extended from 0 to 96 kHz and the cut-off frequency of the low-pass filter 8 was 96 kHz.

Figure 5:
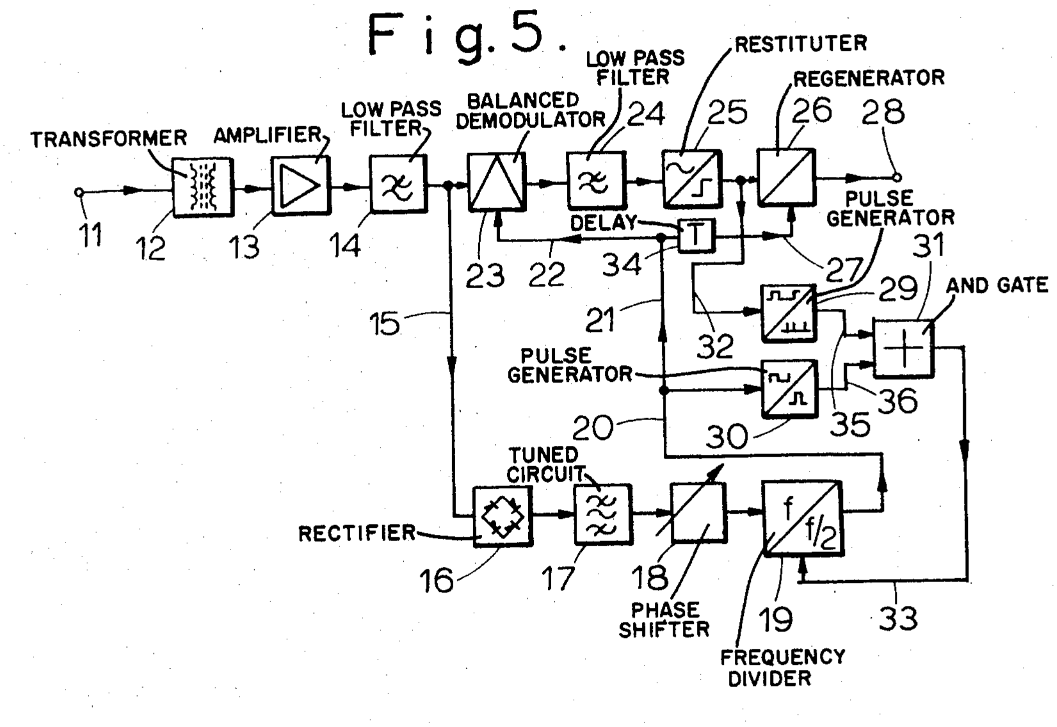
FIG. 5 shows in block diagram form a diphase receiver.

Referring now to FIG. 5 a diphase signal is fed from an external line (not shown) to an input terminal 11 and passes via a line transformer 12 and amplifier 13 to a low-pass filter 14. The output from the filter 14 is fed via a line 15 to a full-wave rectifier 16, the output of which is in turn fed to a tuned circuit, or a narrow-band-pass filter 17. The diphase signal fed in on terminal 11 contains no steady carrier component as the carrier phase is switched through 180° in random sequence depending on the transmitted data. When the signal passes through rectifier 16 however a strong 2nd harmonic of the carrier is developed and the filter 17 is tuned to pass this frequency. The output of the filter 17 is fed to a variable phase element 18 and thence to a frequency-halving circuit 19. Hence the output of circuit 19 is a signal at carrier frequency and controlled in phase by the element 18, this carrier signal is fed via lines 20, 21 and 22 to form an input to a balanced demodulator 23 which receives the line signal output from filter 14 as a second input. The output of the demodulator 23 is fed to a low-pass filter 24 the output of which is squared in a restituter 25; the restituted signal is passed to a regenerator 26 in which it is retimed by means of the delayed carrier signal input on line 27 to produce an isochronous baseband data signal at output terminal 28, the carrier being delayed by element 34 by an amount necessary to put its positive going transition in the centre of each element of the demodulated signal, the timing of the waveforms is shown in FIG. 6.

Since the demodulating carrier signal on line 20 is derived by a process of multiplication and division it is possible for the carrier phase to be in error by 180° and elements 29, 30 and 31 are provided to detect and correct such a phase error if it should arise. If the carrier is correctly phased transitions of the restituted data signal on line 32 should not occur during positive half-cycles of the carrier waveform. The element 29 produces narrow pulses on line 35 corresponding to the transitions of the restituted data signal on line 32 and on the element 30 produces a pulse of width $t$ on line 36 derived from the carrier on line 20 and occurring at the centre of its positive half-cycle; the output of elements 29 and 30 are fed to AND-element 31 which produces a pulse on a lead 33 should the pulses on lines 35 and 36 coincide. This resets the divider 19 if the carrier phase is incorrect. The timing of the above signals is shown in FIG. 6. Optimum results are obtained when the pulse on line 36 has a width equal to one-fourteenth of the element width.

Although the signal waveforms shown in FIGS. 3 and 4 relate to a binary baseband data signal the invention can also be used with multi-level baseband signals; for example to accommodate a quaternary signal two sizes of erect "top hat" and two sizes of inverted "top hat" could be used.

An advantage of the present invention is that it enables line equalisers to be dispensed with for reasons set out at page seven of this specification but it may be useful in some cases to employ a compromise equaliser which produces an attenuation-frequency characteristic intermediate between an unequalised line and a fully equalised line.

What we claim is:

1. A method of converting an isochronous base band data signal into a diphase signal including the steps of applying an unfiltered isochronous base band data signal and a carrier signal having a substantially square-waveform, and a frequency equal to the reciprocal of the duration of one element of the base band data signal to respective inputs of balanced modulating means and shifting the phase relation between the base band data signal and the carrier so that at the modulating means inputs, zero-crossings of the carrier occur one-quarter of a cycle before transitions of the base band data signal.

2. A method of converting an isochronous base band data signal into a diphase signal including the steps of applying an unfiltered isochronous base band data signal and a carrier having a substantially square-waveform and a frequency equal to the reciprocal of the duration of one element of the base band data signal to respective inputs of a modulo 2 adder means and shifting the phase relation between the base band data signal and the carrier so that at the modulo 2 adder means inputs, zero-crossings of the carrier occur one-quarter of a cycle before transitions of the base band data signal.

3. A base band to diphase converter comprising balanced modulating means arranged to receive an unfiltered isochronous base band data signal as a first input and a carrier signal having a substantially square-waveform and of frequency equal to the reciprocal of the duration of one element of the base band data signal as a second input so as to generate the diphase signal at the output of modulating means and delay means connected to receive said square-wave carrier signal prior to application as said second input to cause zero-crossings of the carrier signal at the second input of the modulating means to occur one-quarter of a cycle before transitions of the data signal at the first input of the modulating means.

4. A base band to diphase converter comprising a modulo-2 adder arranged to receive an unfiltered isochronous base band data signal as a first input and a carrier signal having a substantially square-waveform of frequency equal to the reciprocal of the duration of one element of base band data signal as a second input so as to generate a diphase signal at the output of the modulo-2 adder and delay means connected to receive said square-wave carrier signal prior to application as said second input to cause zero-crossings of the carrier signal at the second input of the modulo-2 adder to occur one-quarter of a cycle before transitions of the data signal at the first input of the modulo-2 adder.

* * * * *

UNITED STATES PATENT OFFICE

CERTIFICATE OF CORRECTION

PATENT NO. : 3,846,583

DATED : November 5, 1974

INVENTOR(S) : Richard Arnold Boulter

It is certified that error appears in the above-identified patent and that said Letters Patent are hereby corrected as shown below:

Not Shown:

[30] Foreign Application Priority Data

Oct. 20, 1971 Great Britain . . . . 48817/71

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*